United States Patent Office 2,752,360
Patented June 26, 1956

2,752,360

IMPROVEMENT IN THE MANUFACTURE OF 3-SUBSTITUTED 4-HYDROXYCOUMARINS

Donald F. Starr, Montclair, N. J., and Carmine C. Di Santo, New York, N. Y., assignors to S. B. Penick & Company, Incorporated, New York, N. Y., a corporation of Delaware No Drawing. Application March 23, 1953,
Serial No. 344,208

12 Claims. (Cl. 260—343.2)

Our invention relates to an improvement in the manufacture of 3-substituted 4-hydroxycoumarins, including 3 - (alpha-phenyl-beta-acetylethyl) - 4 - hydroxycoumarin, useful as anticoagulants and rodenticides, as described for instance in "Control of Norway Rats with Residual Rodenticide Warfarin," Wayland J. Hayes, Jr., and Thomas B. Gaines, Public Health Reports, vol. 65, No. 47, November 24, 1950, pages 1537–1555.

The 3-substituted 4-hydroxycoumarins are a new group of compounds described in U. S. Patent 2,427,578. The patentee prepares the compounds by condensing 4-hydroxycoumarin with an alpha,beta-unsaturated ketone, most desirably in pyridine, but also in a lower alcohol or water, with or without any catalyst. The yields are moderate in the order of not more than 50% based on 4-hydroxycoumarin.

Water of course, is a more desirable reaction medium than pyridine, and it is, therefore, an object of our invention to develop a commercially useful method of making 3-substituted 4-hydroxycoumarins which would use water as the reaction medium and a substituted coumarin less expensive than 4-hydroxycoumarin and yet be capable of giving sufficient yields of the desired 3-substituted 4-hydroxycoumarin to make the process economical.

With these objects in mind, we have discovered that a lower alkyl ester of 3-carboxy-4-hydroxycoumarin reacts readily with an alpha,beta-unsaturated ketone in water in the presence of ammonia or an organic amine to form the desired 3-substituted 4-hydroxycoumarin in good yields. This method is useful and novel in several respects.

The lower alkyl esters of 3-carboxy-4-hydroxycoumarin can readily be prepared from acetyl salicylic acid chloride and the alkylester of sodio malonic acid. The reaction between the 3-carboxy-4-hydroxycoumarin and the alpha,beta-unsaturated ketone proceeds smoothly in water in the presence of an organic amine to the desired end products in good yield. The 4-hydroxy-coumarin can be prepared from an alkyl ester of 3-carboxy-4-hydroxycoumarin, but by eliminating this separate step we have been able to simplify the overall procedure and we have found that the yield of the 3-substituted 4-hydroxycoumarins based upon 3-carboxy 4-hydroxycoumarin is substantially higher than the overall yield of the two-step process.

Thus, when converting 3-carbethoxy-4-hydroxycoumarin into 4-hydroxycoumarin with sulfuric acid in the conventional manner, a yield of 87% is obtained. The yield in the condensation step of 4-hydroxycoumarin with benzalacetone in water as reported by the patentees was 48%, and in the two-step process, the overall yield would therefore be only 41.7% based on 3-carbethoxy-4-hydroxycoumarin. If this crude product is condensed with benzalacetone according to any of the procedures described in U. S. Patent 2,427,578 referred to above, the best expected yield of 3-(alpha-phenyl-beta-acetylethyl)-4-hydroxycoumarin would be about 16% based on 3-carbethoxy-4-hydroxycoumarin. In the one-step process described by us the yields of 3-substituted 4-hydroxycoumarins were in the order of 70–80% based on 3-carbethoxy-4-hydroxycoumarin. But when the organic amine was omitted from the reaction mixture, the yield, for example of 3-(alpha-phenyl-beta-acetylethyl)-4-hydroxycoumarin, was only about one-seventh of that obtained when the same compound was prepared in the presence of an organic amine.

It will be seen, therefore, that our new method is more useful and efficient than the earlier methods. It shortens the overall procedure substantially, thus saving time and labor, it can use water as a suitable reaction medium and a less expensive more readily available 4-hydroxycoumarin derivative as initial material, and it gives good yields. The 3-substituted-4-hydroxycoumarins of Patent 2,427,578 are a new group of compounds involving new problems of synthesis, and we found no guidance in the patent and surrounding art for success or failure of our method. We obtained a yield of only 30% by trying to convert 3-carbethoxy-4-hydroxycoumarin to 4-hydroxycoumarin in water containing an organic amine, as reported above. We were surprised to find that the reaction does occur readily in the presence of an alpha,beta-unsaturated ketone, giving the desired products in good yields.

The following examples illustrate our invention:

*Example 1.—3-(alpha-phenyl-beta-acetylethyl)-4-hydroxy coumarin*

Into a one-liter three-neck flask, equipped with reflux condenser and stirrer, are charged 70.2 grams (0.30 mole) of 3-carbethoxy-4-hydroxycoumarin (M. P. 98.5–99.5), 50 grams (0.34 mole) of benzalacetone (congealing point 37–38° C.), 350 ml. of water and 1.52 grams (0.015 mole) of triethylamine. The mix is heated to boiling with stirring and maintained at reflux for 7 hours during which period a heavy precipitate forms. Refluxing is continued for one additional hour with vigorous agitation, and the reaction mixture is then cooled to room temperature. The solid crude product is separated by filtration rinsed with fresh water, and sucked as dry as possible. The crude solids are suspended in 200 ml. of benzol, refluxed with stirring for 30–45 minutes, cooled, filtered and sucked as dry as possible. The solids are dissolved at room temperature in 400 ml. of 5% sodium hydroxide solution (any free benzol is decanted off the surface) and the solution is washed three times as follows: with (1) 200 ml. of carbon tetrachloride, (2) 100 ml. of carbon tetrachloride, and (3) 100 ml. of carbon tetrachloride. The washed alkaline solution is now acidified with strong hydrochloric acid to pH 1–3 whereupon the final product precipitates out. It is filtered off, washed free of chlorides with water and dried to constant weight at 80° to 85° C.

Yield: 67 grams (M. P. 158–159) or 72.5% of theory based upon 3-carbethoxy-4-hydroxycoumarin. U. S. Patent 2,427,578 reports a melting point of about 161° C. for the same product obtained by the method of Example 4 of the patent.

The reaction scheme is as follows:

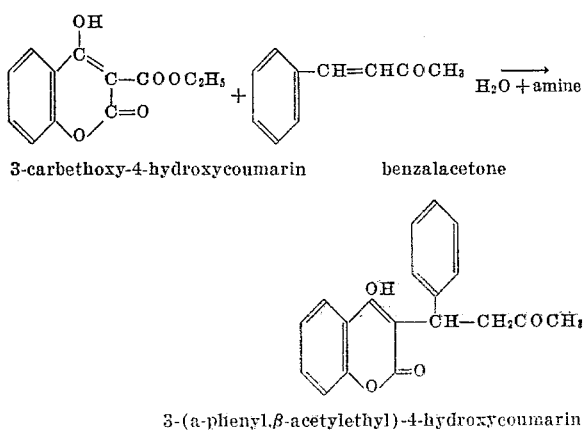

3-carbethoxy-4-hydroxycoumarin benzalacetone 3-(α-phenyl,β-acetylethyl)-4-hydroxycoumarin The compound may be further purified by dissolving 14 grams in 100 ml. of boiling acetone, adding 43 cc. of water slowly and 0.28 gram of activated charcoal, such as Darco G60, and then boiling the mixture for 3 minutes. The mixture is filtered hot and allowed to cool slowly. The needle-like crystals are filtered out and dried at 65° C. and 11.7 grams of warfarin melting at 162–163° C. are obtained. This represents an 83.6% recovery of crystalline product from the precipitated compound.

Our invention may be used with several organic amines as the yield-increasing catalyst and a wide range of concentrations. Our invention is illustrated by, but not limited to, the examples indicated in the following table:

| Mo. Percent Catalyst | Time to form ppt., Hrs. | Percent Yield | M. P., ° C. |
| --- | --- | --- | --- |
| 50 triethylamine | 5.0 | 31.0 | 155–158 |
| 15 triethylamine | 8.0 | 64 | 156–158 |
| 5 triethylamine | 7.2 | 72.5 | 158–159 |
| 5 tributylamine | 5.7 | 75.7 | 157–158 |
| 5 aniline | 8.0 | 60.6 | 156–158 |
| 5 piperidine | 8.0 | 72 | 155–158 |

*Example 2.—3'-(1'-phenyl-2'-benzoyl)-ethyl-4-hydroxycoumarin*

About .06 mole each of 3-carbethoxy-4-hydroxycoumarin and benzalacetophenone are suspended in 300 cc. of distilled water with the addition of 5 mole percent of triethylamine. The mixture is refluxed for 8 hours and then allowed to cool whereupon a solid resinous product is formed. The solid is recovered by filtration and suspended in ether whereupon a crystalline precipitate is formed and recovered at 157–160° C. The yield is about 54%. The product may be recrystallized from hot alcohol.

The same reaction product was obtained in Example 2 of Patent 2,427,578 using pyridine as the reaction medium, but the Stahmann yield was only 30%. This product was also obtained, in the form of a "heavy gum," in Example 3 of the patent using ethanol as reaction medium. The yield of purified and recrystallized product was again only about 30%.

*Example 3.—3-(1'-anisyl-2'-acetyl)-ethyl-4-hydroxycoumarin*

The process of Example 2 is repeated, but instead of using benzal acetophenone, anisal acetone was used. The resinous product soluble in ether is extracted with dilute alkali, washed with ether and acidified to a pH of about 2 with dilute hydrochloride acid. An oil separates which after refrigeration solidifies. The yield of resinous crude material is about 105%. The solid is recovered and recrystallized from hot alcohol thus yielding the desired product melting at 156–157° C. Yield is about 34%.

*Example 4.—3-(p-chloro-1'-phenyl-2'-acetyl)-ethyl-4-hydroxycoumarin*

The process of Example 3 is repeated, but instead of using anisalacetone we use a parachlorobenzal acetone, taking about .03 mole run. The product precipitated melts at about 145–150° C. The yield is about 81%. The product can be recrystallized from hot alcohol; M. P. 164–165° C.

In the foregoing examples, ammonia can take the place of any of the organic amines. Esters of 3-carboxy-4-hydroxycoumarin other than the ethyl ester such as the methyl, propyl, butyl or octyl ester can be used.

What we claim is:

1. The improvement in the manufacture of 3-substituted 4-hydroxycoumarins which comprises heating the ethyl ester of 3-carboxy-4-hydroxycoumarin with an α,β-unsaturated ketone selected from the group consisting of benzalacetone, benzalacetophenone, anisal acetone and parachlorbenzalacetone dispersed in water in the presence of a compound selected from the group consisting of ammonia, lower tertiary alkyl amines, aniline and pyridine.

2. The improvement in the manufacture of 3-substituted 4-hydroxycoumarins which comprises heating the ethyl ester of 3-carboxy-4-hydroxycoumarin with an α,β-unsaturated ketone selected from the group consisting of benzalacetone, benzalacetophenone, anisalacetone, and parachlorbenzalacetone dispersed in water in the presence of a yield-increasing amount of a compound selected from the group consisting of ammonia, lower tertiary alkyl amines and pyridine.

3. The improvement in the manufacture of 3-substituted 4-hydroxycoumarins which comprises heating the ethylester of 3-carboxy-4-hydroxycoumarin with an α,β-unsaturated ketone selected from the group consisting of benzalacetone, benzalacetophenone, anisalacetone and parachlorobenzalacetone dispersed in water in the presence of a compound selected from the group consisting of ammonia, lower tertiary alkyl amines, aniline and pyridine, filtering off the solid precipitate formed during the heating, drying and purifying it.

4. The process of claim 1 wherein the organic amine is present in an amount up to 50 mole percent of the lower alkyl ester.

5. The process of claim 1 wherein the organic amine is present in an amount up to 15 mole percent of the lower alkyl ester.

6. The process of claim 1 wherein the organic amine is present in an amount of about 5 mole percent of the lower alkyl ester.

7. The improvement in the manufacture of 3-(alpha-phenyl-beta-acetylethyl)-4-hydroxy coumarin which comprises heating 3-carbethoxy-4-hydroxy coumarin with benzalacetone dispersed in water in the presence of triethylamine in an amount of 5 mole percent of 3-carbethoxy-4-hydroxycoumarin, filtering off the solid precipitate, drying and purifying it.

8. The improvement in the manufacture of 3-(alpha-phenyl-beta-acetylethyl)-4-hydroxy-coumarin which comprises heating 3-carbethoxy-4-hydroxy coumarin with benzalacetone dispersed in water in the presence of piperidine in an amount of 5 mole percent of 3-carbethoxy-4-hydroxy coumarin, filtering off the solid precipitate formed during heating, drying and purifying it.

9. The improvement in the manufacture of 3-(alpha-phenyl-beta acetylethyl)-4-hydroxy coumarin which comprises heating 3-carbethoxy-4-hydroxycoumarin with benzalacetone dispersed in water in the presence of tributylamine in an amount of 5 mole percent of 3-carbethoxy-4-hydroxycoumarin, filtering off the precipitate formed during heating, drying and purifying it.

10. The process of making 3-(p-chloro-1'-phenyl-2'-acetyl)-ethyl-4-hydroxycoumarin which comprises heating 3-carbethoxy-4-hydroxycoumarin with parachlorobenzal acetone dispersed in water, in the presence of triethylamine in an amount of 5 mole percent of 3-carbethoxy-4-hydroxycoumarin, filtering off the solid precipitate, drying and purifying it.

11. The improvement in the manufacture of 3-(1'-anisyl-2'-acetyl)-ethyl-4-hydroxycoumarin which comprises heating 3-carbethoxy-4-hydroxycoumarin with anisalacetone dispersed in water in the presence of triethylamine in an amount of 5 mole percent of 3-carbethoxy-4-hydroxycoumarin, filtering off the solid precipitate, drying and purifying it.

12. The improvement in the manufacture of 3-(1'-phenyl-2'-benzoyl)-ethyl-4-hydroxycoumarin which comprises heating 3-carbethoxy-4-hydroxycoumarin with benzalacetophenone dispersed in water in the presence of triethylamine in an amount of 5 mole percent of 3-carbethoxy-4-hydroxycoumarin, filtering off the solid precipitate, drying and purifying it.

References Cited in the file of this patent

UNITED STATES PATENTS

| | | |
|---|---|---|
| 2,427,578 | Stahmann et al. | Sept. 16, 1947 |
| 2,666,064 | Starr et al. | Jan. 12, 1954 |

OTHER REFERENCES

Anschutz: Liebig's Annalen, vol. 367 (1909), pp. 196–197.